United States Patent
Flateby

(10) Patent No.: US 7,990,879 B2
(45) Date of Patent: Aug. 2, 2011

(54) METHOD, APPARATUS, SYSTEM, AND COMPUTER PROGRAM PRODUCT FOR INTERRUPTION-FREE CONFERENCE CALLING

(75) Inventor: Paul Flateby, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 1024 days.

(21) Appl. No.: 11/072,277

(22) Filed: Mar. 7, 2005

(65) Prior Publication Data

US 2005/0243741 A1     Nov. 3, 2005

(30) Foreign Application Priority Data

Mar. 5, 2004   (NO) .................................. 20040978

(51) Int. Cl.
H04J 1/16     (2006.01)
(52) U.S. Cl. ..................................... 370/242; 348/14.08
(58) Field of Classification Search .................. 370/238,
370/395.5, 474, 216–228, 242, 260–266;
375/240.26; 709/204; 714/774; 348/14,
348/14.08–14.11, 211.12; 379/158, 202.01,
379/205.01
See application file for complete search history.

(56) References Cited

U.S. PATENT DOCUMENTS

| | | | | |
|---|---|---|---|---|
| 4,979,174 A | * | 12/1990 | Cheng et al. ................... | 714/774 |
| 5,402,418 A | * | 3/1995 | Shibata et al. ................. | 370/264 |
| 5,453,780 A | | 9/1995 | Chen et al. | |
| 5,508,942 A | * | 4/1996 | Agarwal ........................ | 709/204 |
| 5,539,726 A | | 7/1996 | Mizusawa | |
| 5,563,882 A | | 10/1996 | Bruno et al. | |
| 5,568,184 A | | 10/1996 | Shibata et al. | |
| 5,604,738 A | | 2/1997 | Shibata et al. | |
| 5,619,252 A | * | 4/1997 | Nakano ....................... | 348/14.01 |
| 5,920,562 A | * | 7/1999 | Christie et al. ............. | 370/395.5 |
| 6,075,798 A | * | 6/2000 | Lyons et al. ................... | 370/474 |
| 6,124,881 A | | 9/2000 | Terui et al. | |
| 6,219,339 B1 | * | 4/2001 | Doshi et al. ................... | 370/235 |
| 6,731,625 B1 | | 5/2004 | Eastep et al. | |
| 7,006,575 B2 | * | 2/2006 | Yamaguchi et al. ..... | 375/240.26 |
| 7,362,349 B2 | * | 4/2008 | Nelson et al. .............. | 348/14.08 |
| 2002/0064149 A1 | | 5/2002 | Elliott et al. | |
| 2002/0126201 A1 | | 9/2002 | Schmitt et al. | |
| 2004/0003045 A1 | * | 1/2004 | Tucker et al. ................. | 709/205 |
| 2006/0177034 A1 | * | 8/2006 | Reding et al. ............ | 379/211.02 |

FOREIGN PATENT DOCUMENTS

| | | |
|---|---|---|
| DE | 19744056 A1 | 6/1998 |
| EP | 0 691 778 A2 | 1/1996 |
| GB | 2278516 A | 11/1994 |
| JP | 3-52481 | 3/1991 |
| JP | 11-317936 | 11/1999 |
| WO | WO 98/23080 | 5/1998 |
| WO | WO 03/065706 A2 | 8/2003 |

* cited by examiner

*Primary Examiner* — Ricky Ngo
*Assistant Examiner* — Kan Yuen
(74) *Attorney, Agent, or Firm* — Oblon, Spivak, McClelland, Maier & Neustadt, L.L.P.

(57) ABSTRACT

The present invention relates to instability problems in circuit switched conferencing, and provides a method for establishing a backup "voice only" telephony link in parallel with a H.320 conference link. The two links between the calling parties is handled as one logical call entity. Audio is muted on the backup voice telephony link when status of the H.320 link is okay. If communication problems are detected on the H.320 link, audio is muted over the H.320 link and switched to the backup voice telephony link instead.

21 Claims, 7 Drawing Sheets

|  | b1 | b2 | b3 | b4 | b5 | b6 | b7 | b8 |
|---|---|---|---|---|---|---|---|---|
| Octet 1 | 0 | \multicolumn{6}{c\|}{ALIGN} | |
| | 0 | 1 | 1 | 1 | 1 | 1 | 1 | 1 |
| 2 | 1 | \multicolumn{6}{c\|}{Channel ID} | 1 |
| 3 | 1 | \multicolumn{6}{c\|}{Group ID} | 1 |
| 4 | 1 | \multicolumn{3}{c\|}{Operating Mode} | \multicolumn{3}{c\|}{Res} | 1 |
| 5 | 1 | \multicolumn{6}{c\|}{RMULT} | 1 |
| 6 | 1 | \multicolumn{3}{c\|}{SUBMULT} | \multicolumn{2}{c\|}{BCR} | Res | MFG | 1 |
| 7 | 1 | RI | RL Req | RL Ind | \multicolumn{3}{c\|}{REV} | 1 |
| 8 | 1 | \multicolumn{6}{c\|}{Subaddress} | 1 |
| 9 | 1 | \multicolumn{6}{c\|}{Transfer Flag} | 1 |
| 10 | 1 | 1 | 1 | \multicolumn{4}{c\|}{Digit - 1} | 1 |
| 11 | 1 | 1 | 1 | \multicolumn{4}{c\|}{Digit - 2} | 1 |
| 12 | 1 | 1 | 1 | \multicolumn{4}{c\|}{Digit - 3} | 1 |
| 13 | 1 | 1 | 1 | \multicolumn{4}{c\|}{Digit - 4} | 1 |
| 14 | 1 | 1 | 1 | \multicolumn{4}{c\|}{Digit - 5} | 1 |
| 15 | 1 | 1 | 1 | \multicolumn{4}{c\|}{Digit - 6} | 1 |
| 16 | 1 | 1 | 1 | \multicolumn{4}{c\|}{Digit - 7} | 1 |

Figure 2

H.320 link has been broken, and isdn
channels forming the H.320 link are
disconnected. Parties communicate via
the voice backup link that has not
been disconnected A-side initiates call to b-side
requesting to set up the first isdn
channel as a data channel (using
bearer capability "unrestricted
digital") → B-side will accept setup of
the first channel A-side uses bas-signalling over the
open first isdn channel to notice the
b-side that this call is an attempt
to reconnect a diconnected call ← When b-side receives signal
from a-side indicating that
this is a reconnect call,
it will notice the aside
that the bonding process
can continue Both sides will continue bonding
process until all isdn channels
forming the H.320 link has been
established

TIME

When H.320 link is established, both
ends will use H.221 A-bit mechanism
to synchronize the switching of audio
from the backup voice link to the
H.320 link

*Fig.5*

METHOD, APPARATUS, SYSTEM, AND COMPUTER PROGRAM PRODUCT FOR INTERRUPTION-FREE CONFERENCE CALLING

CROSS REFERENCE TO RELATED APPLICATION

The present application claims priority and contains subject matter related to Norwegian Patent Application number 20040978, filed on Mar. 5, 2004, and the entire contents of which are hereby incorporated herein by reference.

FIELD OF THE INVENTION

The present invention relates to conferencing, in particular to preventing instability problems in circuit switched conferencing.

BACKGROUND OF THE INVENTION

A common standard for multimedia communications over circuit switched networks like ISDN (Integrated Services Digital Network) is the H.320 standard from the International Telecommunications Union (ITU). H.320 is an umbrella standard with several sub-standards defining the different protocol layers. An example of a sub-standard is H.221. H.221 is the framing protocol of H.320. The purpose of H.221 is to define a frame structure for audiovisual teleservices.

Video conferencing calls (hereafter referred to as H.320 calls) over ISDN networks need more bandwidth than normal voice telephony calls. The protocol ISO 13871, normally referred to as BONDING, supports communication over a set of separate ISDN channels to combine their bandwidths into a single coherent channel, hereafter referred to as an H.320 link. For example, a 256 kb/s data stream can be supported over four 64 kb/s channels. Sound and picture quality correlates with the number of channels (bandwidth) used.

BONDING (ISO 13871) is a technique first drafted by the BONDING consortium, and later maintained by the International Organization for Standardization (ISO). The technique is used to create frame structures and procedures for establishing a wideband communication connection by combining multiple switched 56/64 kbit/s channels. BONDING was originally described in the specification "Interoperability Requirements for Nx56/64 kbit/s Calls" issued by the BONDING consortium, the entirety of which is hereby incorporated by reference. The current protocol is described in the specification ISO 13871, "Digital Channel Aggregation," maintained by the International Organization for Standardization, the entire contents of which are hereby incorporated by reference. The main task of a BONDING technique is to align data octets of the individual channels. Channels used for the wideband connection are routed independently of each other. Thus, the data in each channel might be individually delayed relative to the data in other channels. The defined frame structure for each 56/64 kbit/s bearer channel provides for the alignment of data octets from the individual channels to their original sequence before reforming the individual channels into a composite serial data stream at the terminating end.

H.320 calls (transmitting data over ISDN using bearer capability "unrestricted digital") are exposed to more instability and disconnections on low quality (noisy) ISDN networks than normal voice telephony calls (transmitting voice over ISDN using bearer capability "speech"). Low quality ISDN network conditions can cause H.320 calls to disconnect frequently. This is because H.320 links are made of several separate ISDN channels combined by the BONDING process. As an example, when the timing of one channel slips, a resynchronization process is required for the whole link. This will appear to the user as a disturbing interruption in the communication with the other party. Further, a H.320 link sometimes has to re-route one of the B-channels. Then the BONDING procedure must be carried out again, and the user will experience another interruption. These interruptions may also cause complete disconnections.

Such communication breakdowns between the calling parties cause users to have bad experiences with video conferencing.

SUMMARY OF THE INVENTION

An object of the present invention is to address the above-identified and other limitations of conventional multimedia communications.

In one exemplary embodiment, a method for supporting a conference communication link includes the steps of establishing an ISDN audio link in a non-transmitting state when initiating the conference communication link, monitoring the conference communication link for predefined errors and/or events, and changing the ISDN audio link to a transmitting state, and the conference communication link to a non-transmitting state when one or more of said errors and/or events are detected.

In another exemplary embodiment, an apparatus for maintaining a conference link for communication between a plurality of endpoints includes an establishing unit configured to establish an ISDN audio link between the endpoints when initiating the conference link; a monitoring unit configured to monitor the conference link for predefined errors or events; and a switching unit configured to switch communication from the conference link to the ISDN audio link when one or more of the predetermined errors or events are detected, and to switch the communication from the ISDN audio link back to the conference link when the detected errors or events have disappeared or when the conference link is re-established.

In another exemplary embodiment, a system for establishing a videoconference includes a first endpoint configured to establish a conference link with another endpoint; the first endpoint including: an establishing unit configured to establish an ISDN audio link between the endpoints when initiating the conference link; a monitoring unit configured to monitor the conference link for predefined errors or events; and a switching unit configured to switch communication from the conference link to the ISDN audio link when one or more of the predetermined errors or events are detected, and to switch the communication from the ISDN audio link back to the conference link when the detected errors or events have disappeared or when the conference link is re-established.

In another exemplary embodiment, a computer program product storing instructions for execution on a computer system, which when executed by the computer system, causes the computer system to perform the method for supporting a conference communication link.

BRIEF DESCRIPTION OF THE DRAWINGS

In order to make the embodiments of the invention more readily understandable, the discussion that follows will refer to the accompanying drawings.

FIG. 2 is an exemplary block diagram of an Information Channel Frame used in the BONDING procedure;

FIG. 5 is a time flow chart illustrating switching audio from a back up voice link to an H.320 link after reestablishment of the H.320 link;

DETAILED DESCRIPTION OF THE PREFERRED EMBODIMENTS

In the following, a non-limiting embodiment of the present invention will be discussed by referring to the accompanying drawings. However, people skilled in the art will realize other applications and modifications within the scope of the invention as defined in the enclosed claims.

According to one embodiment of the present invention, one of the ISDN channels allocated for a videoconference is used as a backup "voice only" telephony link. This backup link is set up in parallel with the H.320 link. The two links between the calling parties is handled as one logical call entity.

Audio is muted on the backup voice telephony link when status of the H.320 link is okay. If communication problems are detected on the H.320 link, audio over the H.320 link is muted and the video conference is switched to the backup voice telephony link. The video call mode with a backup voice telephony link is hereafter referred to as voice backup mode.

Figure 1:
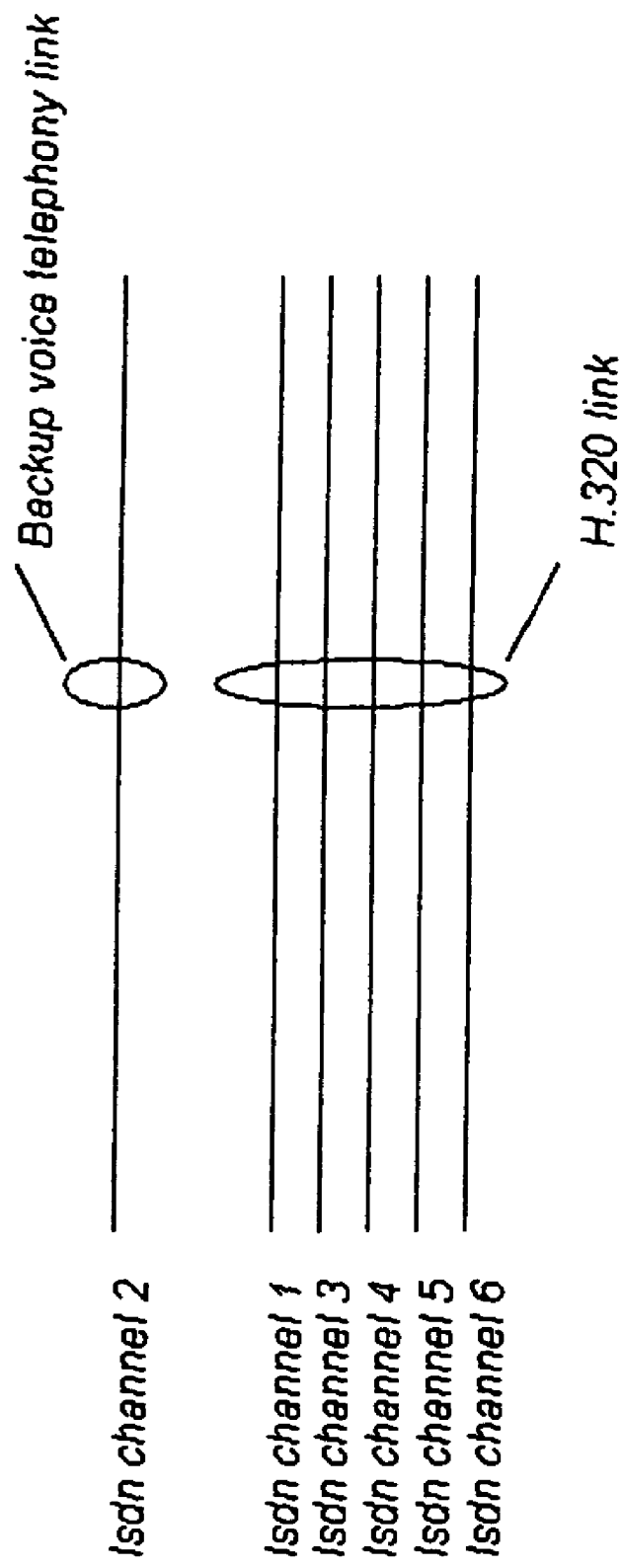
FIG. 1 illustrates the channel configuration according to an embodiment of the present invention.
Figure 3:
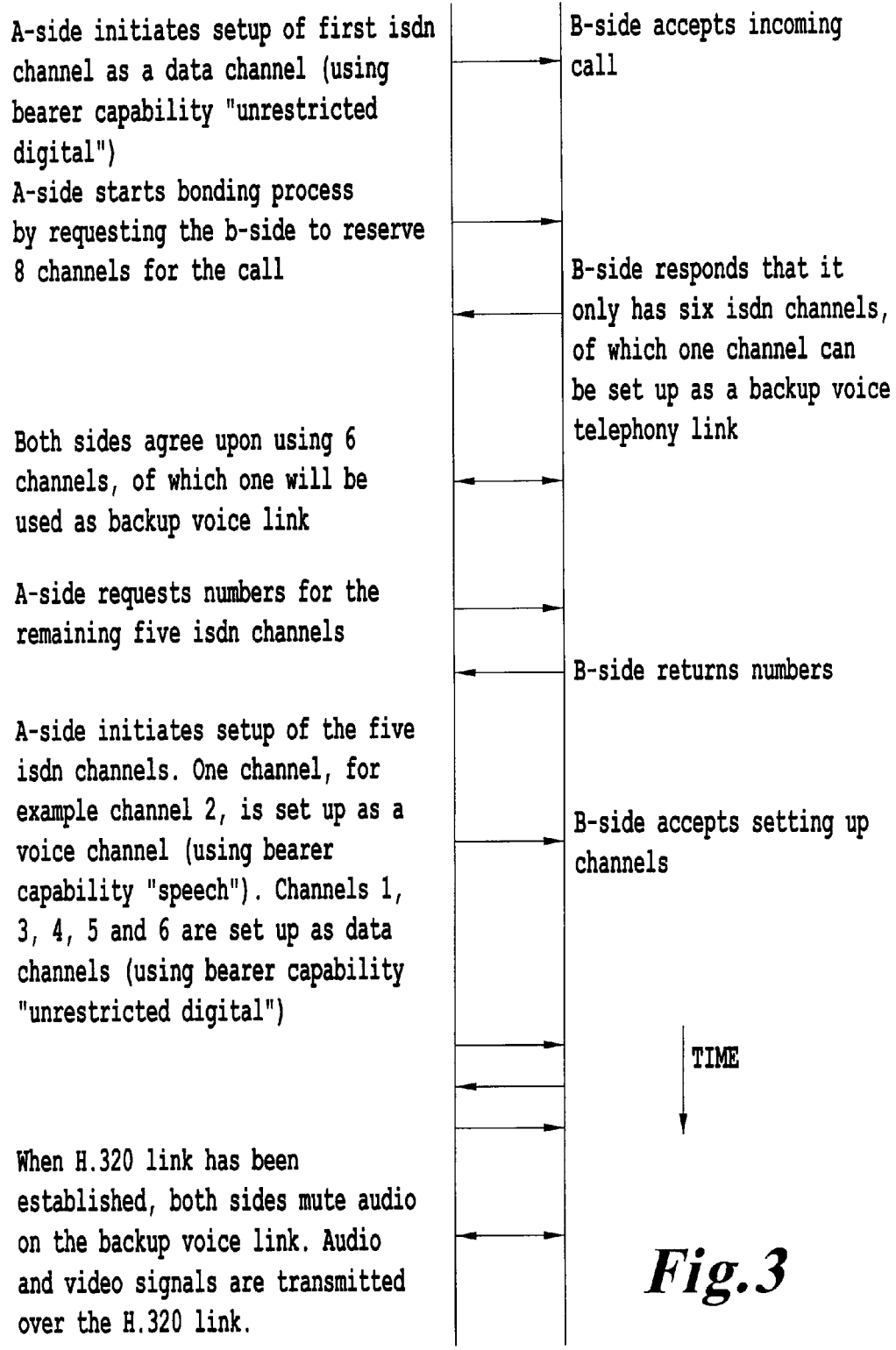
FIG. 3 is a time flow chart illustrating an exemplary set-up procedure in back up mode.

FIG. 3 illustrates a process of setting up a H.320 call between two parties, a and b. The a-side has in, this exemplary embodiment, 8 available ISDN B-channels and is enabled to run in voice backup mode, while the b-side has, in this exemplary embodiment, 6 available ISDN B-channels and is also enabled to run in voice backup mode.

The a-side initiates a call to the b-side by setting up one ISDN B-channel. The request for a B-channel is transmitted via the ISDN D-channel by setting the bearer capability field in the SETUP or CONNECT message to "unrestricted digital" (data channel). When this first channel has been established, the a-side may start the BONDING process by requesting the b-side to reserve 8 channels for the call. The b-side system only has 6 channels available, so it will reply that it can only use 6 channels, of which one channel can be set up as a backup voice telephony link.

In the BONDING procedure, Information Channel Frames, which is illustrated in FIG. 2, communicate control information for the BONDING in the B-channel. According to an embodiment of the present invention, one of the reserved bits (Res) in the Information Channel message is preferably used to signal the voice backup mode capability between the systems. These bits are normally set to 1, and ignored on receipt. However, the End-Points allowing voice backup mode should be configured not to ignore these bits, and a certain bit pattern different from 1's only, could indicate establishment of a back up voice link.

Returning to the example, the systems have agreed to use 6 ISDN channels for the call, one of which is used as a backup voice telephony link. The a-side will request the b-side for the dial numbers of the five remaining ISDN channels. The b-side returns the numbers and the a-side initiates the call setup process. The five channels are set up simultaneously, i.e. in parallel. One of the channels, for example channel 2, is set up as the voice telephony link. For this channel the bearer capability field in the SETUP or CONNECT message is set to "speech". The five other channels, 1, 3, 4, 5 and 6, are set up using bearer capability "unrestricted digital".

When the BONDING procedure is completed, channels 1, 3, 4, 5 and 6 will form the H.320 link, and channel 2 will be the backup voice telephony link. When the H.320 link has been established, audio is muted on the backup voice telephony link by both sides, while audio and video are transmitted over the H.320 link. Alternatively, the backup voice telephony link is preferably muted on input, which means that data that normally would have been received is discarded at the input of the receiver. In this way, the link is ready for instant back up if the H.320 link fails.

An alternative method is to mute the backup voice telephony link on output, which means that data that normally would have been transmitted is discarded at the output of the transmitter.

Figure 4:
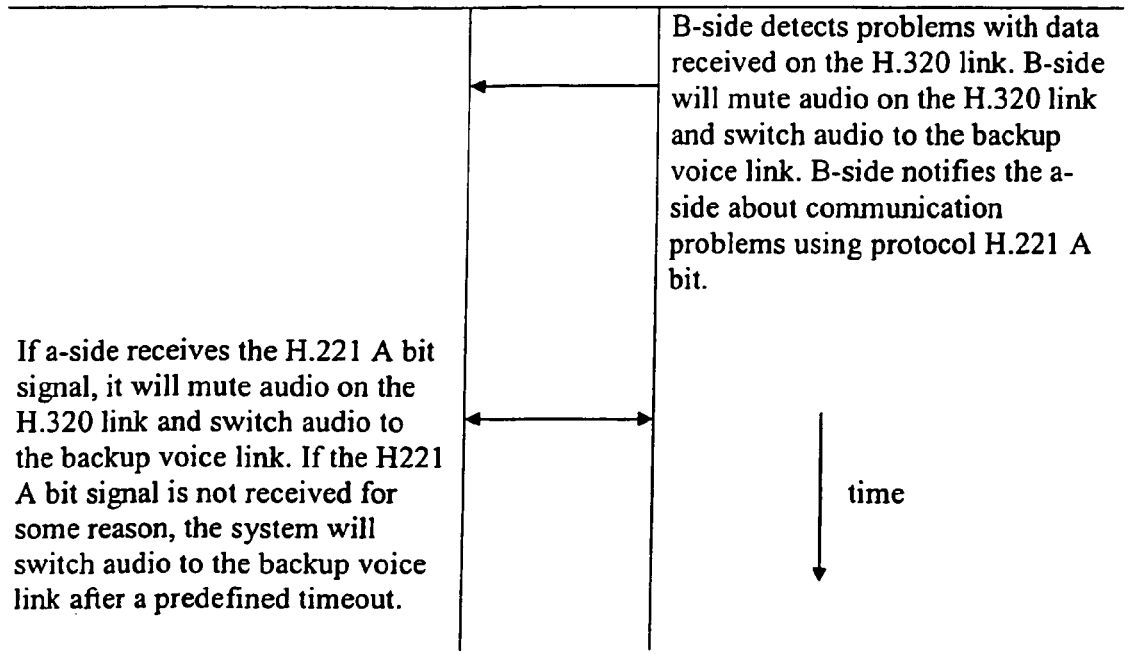
FIG. 4 is a time flow chart illustrating switching an audio signal from a H.320 link to a back up voice link.

According to an embodiment of the present invention, when a backup voice telephony link is established, communication between the parties is switched from H.320 to backup voice telephony link when certain errors are detected. This is illustrated in FIG. 4. There are two main error situations that are likely to occur in H.320 communication, errors in the media stream and errors in framing (fas/bas). Four modes of bonding operation, mode 0, 1, 2 and 3, are described in the above referred "Interoperability Requirements for Nx56/64 kbit/s Calls" issued by the BONDING consortium. Modes 2 and 3 provide in-band monitoring functions. Mode 1 does not provide an in-band monitoring function. Hence, error conditions on one or more channels are not recognized automatically. For mode 1, error detection can be facilitated using cyclic redundancy checks on the media streams, and mechanisms for detecting framing errors.

When errors in these categories occur, a video system will typically initiate a resynchronization process. When a video system running in backup voice mode initiates a resynchronization process, the system (the b-side as illustrated in FIG. 4) will mute audio over the H.320 link and switch audio to the backup voice link. Again, muting is accomplished on the respective receiver inputs, so data still is generated, but not received. Contrarily, the backup voice link is switched on by no longer discarding at the inputs. The b-side then notifies the a-side about the problem using the existing mechanism in protocol H.221 A bit. The A bit of protocol H.221 indicates whether a participating party is in sync or has initiated a resynchronization process. If the a-side receives a high H.221 A bit signal from the b-side, it will mute audio over the H.320 link and switch audio to the backup voice link. If the a-side does not receive the H.221 A bit message for some reason, the system will switch audio to the backup voice link after a predefined timeout.

Advanced video conferencing systems, such as the Tandberg 6000, will automatically try to reestablish a faulty H.320 link using mechanisms such as resynchronization and down speeding (reducing the number of ISDN channels used for the call). These attempts may succeed, but they may also fail. When systems do not succeed in reestablishing the H.320 link automatically, the call will be disconnected.

Hence there are two scenarios for reestablishing normal H.320 call mode after a switch to backup mode:

the video conferencing systems do not manage to reestablish the H.320 link after the communication problems, and all ISDN-channels associated with the H.320 link are disconnected; or the video conferencing systems manage to reestablish the H.320 link automatically.

Referring to FIG. 5, in the case where the H.320 link is completely disconnected and only the backup voice telephony link is open, the following mechanism can be made to aid users in reconnecting the H.320 link.

The system at the a-side (that originally initiated the call) attempts to set up a new H.320 link, either automatically or after a manual confirmation from the user. The b-side accepts the request to set up the first ISDN channel. Before continuing the BONDING process to set up more ISDN channels, the a-side must communicate (over the first ISDN channel) that the new call is an attempt to reconnect a failed H.320 link. The signal must be sent to let the b-side know that the incoming call originates from the same endpoint that was just disconnected. If this is not signaled, the b-side will not accept the call, and the first ISDN channel will be disconnected. This will ensure that the ongoing conference/call is not disturbed. If the reconnect signal is sent, the BONDING process will continue until the H.320 link has been reestablished. When systems diagnose the H.320 link to be okay, the H.221 A-bit mechanism as described above is used to synchronize when to mute audio on the backup voice telephony link and switch audio to the H.320 link. The calling parties have been able to communicate via the backup voice telephony link during the reconnection procedure.

In a case where the systems succeed in reestablishing the H.320 link after running through automatic resynchronization and (sometimes) down speeding procedures, voice audio will be muted on the backup link and switched to the H.320 link when systems at both ends diagnose H.320 link to be okay. This switch can also be synchronized using the H.221 A-bit signaling procedure.

Figure 6:
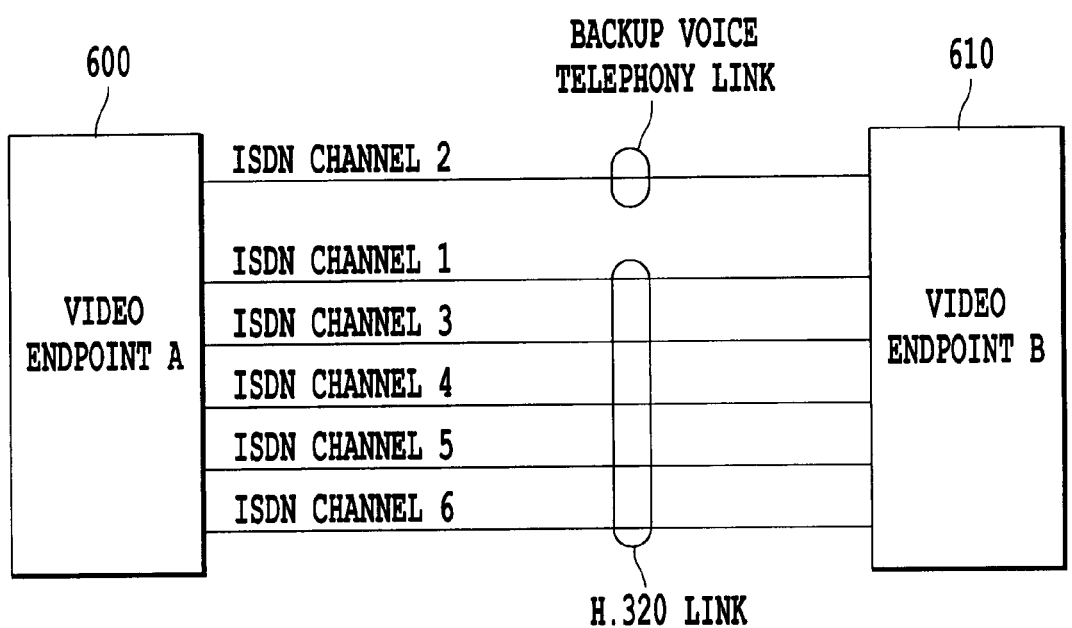
FIG. 6 is a block diagram of an exemplary system for establishing a video conference between two endpoints using the present invention.

FIG. 6 illustrates a system for establishing a video conference between two endpoints using the present invention. A video endpoint A 600 is configured to establish an H.320 link with a video endpoint B 610. The H.320 link includes 5 ISDN channels, while an additional channel functions as a backup voice telephony link.

Each video endpoint includes an establishing unit configured to establish an ISDN audio link between the endpoints when initiating a conference link. Each video endpoint includes a monitoring unit configured to monitor the conference link for predefined errors or events. In some embodiments, the predefined events are an occurrence of a resynchronization process of said conference link. The endpoints include a switching unit configured to switch communication from the conference link to the ISDN audio link when one or more of the predetermined errors or events are detected. The switching unit is also configured to switch the communication from the ISDN audio link back to the conference link when the detected errors or events have disappeared or when the conference link is re-established.

In another exemplary embodiment, the establishing unit is further configured to indicate a presence of the ISDN audio link by inserting a predefined bit pattern in a Res field of an information channel frame in a BONDING procedure.

In another exemplary embodiment, the video endpoint includes a discarding unit configured to discard data at one of an output or an input of the video endpoint.

In another exemplary embodiment, the conference link includes a number of ISDN data links merged together by a BONDING procedure.

Figure 7:
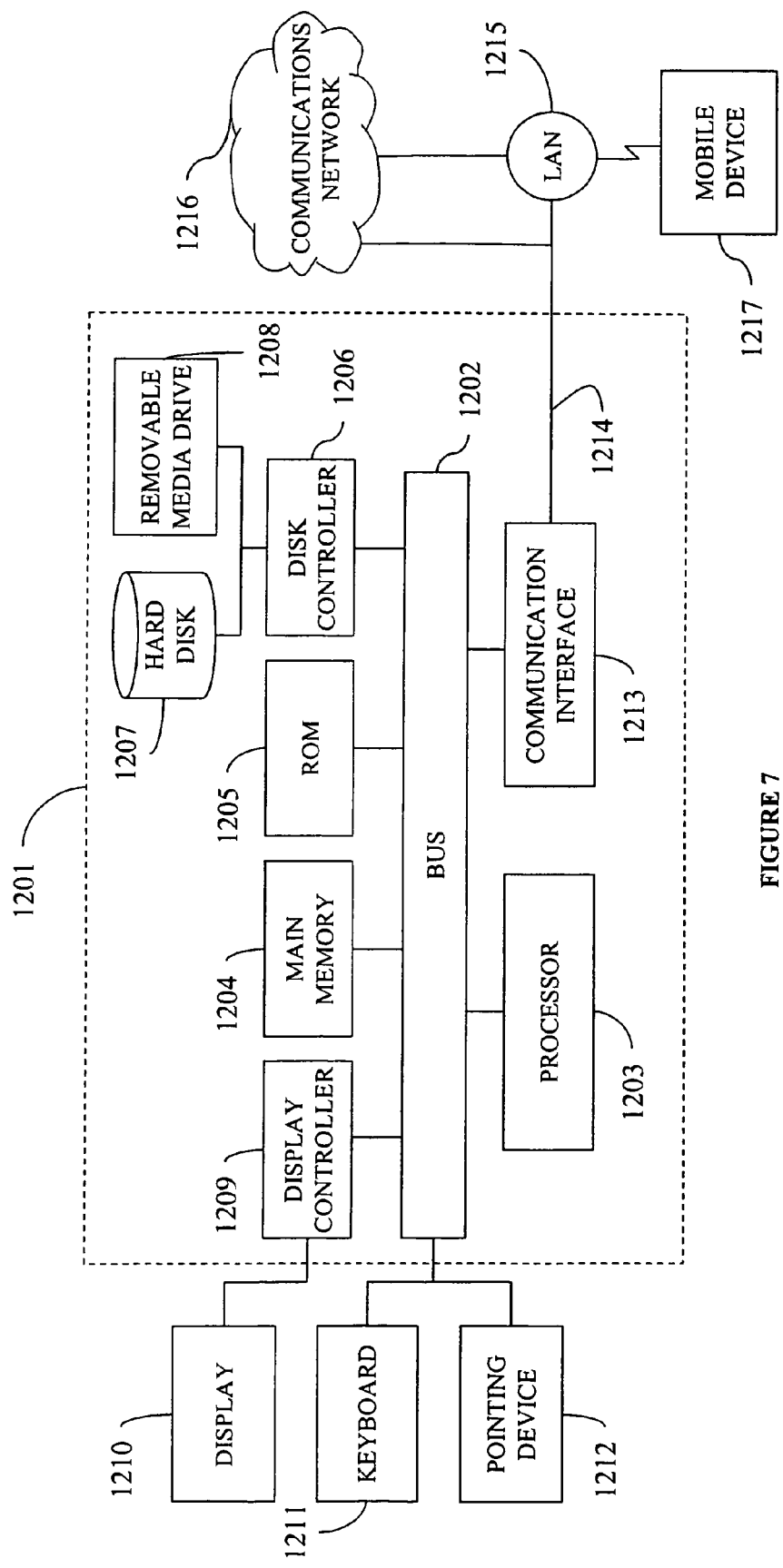
FIG. 7 is a block diagram of a computer system upon which an embodiment of the present invention may be implemented

FIG. 7 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM. SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, and volatile media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for supporting a conference link for communication between two or more endpoints, comprising steps of:
   initiating the conference link between the two or more endpoints, said conference link transmitting both video and audio;
   establishing, at one of the two or more endpoints, an ISDN (Integrated Services Digital Network) audio-only link between the two or more endpoints when initiating the conference link,
   wherein said conference link transmits both video and audio simultaneously and in parallel with said audio-only link transmitting only audio;
   monitoring, at one of the two or more endpoints, the conference link for predefined errors or events;
   switching, at one of the two or more endpoints, communication from the conference link to the ISDN audio-only link when one or more of said predefined errors or events is detected in the conference link;
   switching, at one of the two or more endpoints, the communication from the ISDN audio-only link back to the conference link when detected errors or events in the conference link have disappeared or when the conference link is re-established; and discarding data at an output of a transmitting end-point when the ISDN audio-only link is not in use.

2. The method according to claim 1, wherein the conference link is an H.320 link comprising a number of ISDN data links merged together.

3. The method according to claim 2, wherein the step of establishing said ISDN audio-only link further includes indicating a presence of the ISDN audio-only link by inserting a predefined bit pattern in a Res field of an Information Channel Frame.

4. The method according to claim 2, wherein one of said predefined events is an occurrence of a resynchronization process of said conference link.

5. A method for supporting a conference link for communication between two or more endpoints, comprising steps of:

initiating the conference link between the two or more endpoints, said conference link transmitting both video and audio;

establishing, at one of the two or more endpoints, an ISDN (Integrated Services Digital Network) audio-only link between the two or more endpoints when initiating the conference link, wherein said conference link transmits both video and audio simultaneously and in parallel with said audio-only link transmitting only audio;

monitoring, at one of the two or more endpoints, the conference link for predefined errors or events;

switching, at one of the two or more endpoints, communication from the conference link to the ISDN audio-only link when one or more of said predefined errors or events is detected in the conference link;

switching, at one of the two or more endpoints, the communication from the ISDN audio-only link back to the conference link when detected errors or events in the conference link have disappeared or when the conference link is re-established; and discarding data at an input of a receiving end-point when the ISDN audio-only link is not in use.

6. An apparatus for maintaining a conference link for communication between a plurality of endpoints, comprising:

an initiating unit configured to initiate the conference link between the plurality of endpoints, said conference link being configured to transmit both video and audio;

an establishing unit configured to establish an ISDN (Integrated Service Digital Network) audio-only link between the plurality of endpoints when initiating the conference link, wherein said conference link transmits both video and audio simultaneously and in parallel with said audio-only link transmitting only audio;

a monitoring unit configured to monitor the conference link for predefined errors or events;

a switching unit configured to switch communication from the conference link to the ISDN audio-only link when one or more of said predefined errors or events are detected, and to switch the communication from the ISDN audio-only link back to the conference link when detected errors or events in the conference link have disappeared or when the conference link is re-established; and a discarding unit configured to discard data at one of an output of a transmitting End-Point and an input of a receiving end-point, when the ISDN audio-only link is not in use.

7. The apparatus of claim 6, wherein the establishing unit is further configured to indicate a presence of the ISDN audio-only link by inserting a predefined bit pattern in a Res field of an Information Channel Frame.

8. The apparatus of claim 6, wherein one of said predefined events is an occurrence of a resynchronization process of said conference link.

9. The apparatus of claim 6, wherein the conference link is an H.320 link comprising a number of ISDN data links merged together.

10. The apparatus of claim 6, further comprising:
a processor device;
a memory;
a communication interface;
a display device; and
a bus configured to communicatively interconnect the processor device, the memory, the communication interface, and the display device.

11. A system for establishing a videoconference, comprising
a first endpoint unit configured to establish a conference link with another endpoint unit, said conference link being configured to transmit both video and audio, said first endpoint unit including
an establishing unit configured to establish an ISDN (Integrated Services Digital Network) audio-only link between the first endpoint unit and another endpoint unit when initiating the conference link,
wherein said conference link transmits both video and audio simultaneously and in parallel with said audio-only link transmitting only audio,
a monitoring unit configured to monitor the conference link for predefined errors or events,
a switching unit configured to switch communication from the conference link to the ISDN audio-only link when one or more of said predefined errors or events are detected, and to switch the communication from the ISDN audio-only link back to the conference link when detected errors or events in the conference link have disappeared or when the conference link is re-established, and
a discarding unit configured to discard data at one of an output of a transmitting end-point and an input of a receiving end-point, when the ISDN audio-only link is not in use.

12. The system of claim 11, further comprising:
a second endpoint unit configured establish a second conference link with said first endpoint unit, said second endpoint unit including
a second establishing unit configured to establish a second ISDN audio-only link between the first endpoint unit and another endpoint unit when initiating the second conference link;
a second monitoring unit configured to monitor the second conference link for predefined errors or events; and
a second switching unit configured to switch communication from the second conference link to the second ISDN audio-only link when one or more of said predefined errors or events are detected, and to switch the communication from the second ISDN audio link back to the second conference link when detected errors or events have disappeared or when the second conference link is re-established.

13. The system of claim 11, wherein the establishing unit is further configured to indicate a presence of the ISDN audio link by inserting a predefined bit pattern in a Res field of an Information Channel Frame.

14. The system of claim 11, wherein one of said predefined events is an occurrence of a resynchronization process of said conference link.

15. The system of claim 11, wherein the conference link is an H.320 link comprising a number of ISDN data links merged together.

16. The system of claim 11, wherein the first endpoint unit comprises:
- a processor device;
- a memory;
- a communication interface;
- a display device; and
- a bus configured to communicatively interconnect the processor device, the memory, the communication interface, and the display device.

17. A non-transitory computer readable storage memory, encoded with instructions, which when executed by a computer, causes the computer to perform a method for supporting a conference link for communication between two or more endpoints, comprising:
- initiating the conference link between the two or more endpoints, said conference link transmitting both video and audio;
- establishing, at one of the two or more endpoints, an ISDN (Integrated Services Digital Network) audio-only link between the two or more endpoints when initiating the conference link,
- wherein said conference link transmits both video and audio simultaneously and in parallel with said audio-only link transmitting only audio;
- monitoring, at one of the two or more endpoints, the conference link for predefined errors or events;
- switching, at one of the two or more endpoints, communication from the conference link to the ISDN audio-only link when one or more of said predefined errors or events is detected;
- switching, at one of the two or more endpoints, the communication from the ISDN audio-only link back to the conference link when detected errors or events in the conference link have disappeared or when the conference link is re-established; and
- discarding data at an output of a transmitting end-point when the ISDN audio-only link is not in use.

18. The non-transitory computer readable storage memory of claim 17, wherein the one of the two or more endpoints includes a processor device, a memory, a communication interface, a display device, and a bus configured to communicatively interconnect the processor device, the memory, the communication interface, and the display device.

19. An apparatus for maintaining a conference link for communication between a plurality of endpoints, comprising:
- means for initiating the conference link between the plurality of endpoints, said conference link transmitting both video and audio;
- means for establishing an ISDN (Integrated Service Digital Network) audio-only link between the two or more endpoints when initiating the conference link,
- wherein said conference link transmits both video and audio simultaneously and in parallel with said audio-only link transmitting only audio;
- means for monitoring the conference link for predefined errors or events;
- means for switching communication from the conference link to the ISDN audio-only link when one or more of said predefined errors or events is detected, and the communication from the ISDN audio-only link back to the conference link when detected errors or events in the conference link have disappeared or when the conference link is re-established; and
- means for discarding data at one of an output of a transmitting end-point and an input of a receiving end-point, when the ISDN audio-only link is not in use.

20. The method of claim 1, wherein the one of the two or more endpoints includes a processor device, a memory, a communication interface, a display device, and a bus configured to communicatively interconnect the processor device, the memory, the communication interface, and the display device.

21. A non-transitory computer readable storage memory, encoded with instructions, which when executed by a computer, causes the computer to perform a method for supporting a conference link for communication between two or more endpoints, comprising:
- initiating the conference link between the two or more endpoints, said conference link transmitting both video and audio;
- establishing, at one of the two or more endpoints, an ISDN (Integrated Services Digital Network) audio-only link between the two or more endpoints when initiating the conference link,
- wherein said conference link transmits both video and audio simultaneously and in parallel with said audio-only link transmitting only audio;
- monitoring, at one of the two or more endpoints, the conference link for predefined errors or events;
- switching, at one of the two or more endpoints, communication from the conference link to the ISDN audio-only link when one or more of said predefined errors or events is detected in the conference link;
- switching, at one of the two or more endpoints, the communication from the ISDN audio-only link back to the conference link when detected errors or events in the conference link have disappeared or when the conference link is re-established; and
- discarding data at an input of a receiving end-point when the ISDN audio-only link is not in use.

* * * * *